United States Patent
Naunheim et al.

(10) Patent No.: US 10,190,488 B2
(45) Date of Patent: Jan. 29, 2019

(54) METHOD FOR PRODUCING A VARIABLE TURBINE GEOMETRY

(71) Applicant: Bosch Mahle Turbo Systems GmbH & Co. KG, Stuttgart (DE)

(72) Inventors: Dirk Naunheim, Stuttgart (DE); Daren Bolbolan, Hochdorf (DE)

(73) Assignee: Bosch Mahle Turbo Systems GmbH & Co. KG (DE)

(*) Notice: Subject to any disclaimer, the term of this patent is extended or adjusted under 35 U.S.C. 154(b) by 454 days.

(21) Appl. No.: 15/004,546

(22) Filed: Jan. 22, 2016

(65) Prior Publication Data

US 2016/0215687 A1  Jul. 28, 2016

(30) Foreign Application Priority Data

Jan. 22, 2015 (DE) .................. 10 2015 201 078

(51) Int. Cl.

| | | |
|---|---|---|
| *B23P 15/02* | (2006.01) | |
| *F02B 37/24* | (2006.01) | |
| *F01D 17/16* | (2006.01) | |
| *F01D 9/04* | (2006.01) | |
| *F01D 17/14* | (2006.01) | |

(52) U.S. Cl.
CPC ............. *F02B 37/24* (2013.01); *B23P 15/02* (2013.01); *F01D 9/041* (2013.01); *F01D 9/042* (2013.01); *F01D 17/14* (2013.01); *F01D 17/165* (2013.01); *F05D 2220/40* (2013.01); *F05D 2240/12* (2013.01); *F05D 2240/80* (2013.01)

(58) Field of Classification Search
CPC .. F02B 37/24; F01D 17/14; F02C 6/12; F04D 29/24; F04D 29/60; F04D 29/62; F04D 29/622; F04D 29/624; F04D 29/628; B23P 15/02; B23P 15/04

See application file for complete search history.

(56) References Cited

U.S. PATENT DOCUMENTS

| | | | |
|---|---|---|---|
| 7,117,596 B2 | 10/2006 | Ohishi | |
| 2011/0299977 A1* | 12/2011 | Memmer | F01D 11/122 |
| | | | 415/173.4 |
| 2012/0301288 A1* | 11/2012 | Maier | F01D 17/165 |
| | | | 415/208.1 |

FOREIGN PATENT DOCUMENTS

| | | |
|---|---|---|
| CN | 102652207 A | 8/2012 |
| DE | 60009298 T2 | 8/2004 |
| DE | 102011079580 A1 | 1/2013 |
| EP | 0226444 B1 | 4/1991 |
| EP | 1577503 A1 | 9/2005 |

OTHER PUBLICATIONS

English abstract for DE-102011079580.
English abstract for EP-1577503.

(Continued)

*Primary Examiner* — Richard Edgar
*Assistant Examiner* — Danielle M Christensen
(74) *Attorney, Agent, or Firm* — Fishman Stewart PLLC

(57) ABSTRACT

A method for producing a variable turbine geometry of a charging device may include inserting at least two guide blades into a blade mounting ring. The method may then include jointly machining at least two of the guide blades, in the mounted state, on respective end side of the at least two guide blades facing away from the blade mounting ring in order to produce a final shape of the end sides.

12 Claims, 1 Drawing Sheet

(56) References Cited

OTHER PUBLICATIONS

German Search Report for DE-102015201078.3, dated Oct. 14, 2015.
English Abstract for CN102652207A.
Office Action dated Oct. 8, 2018 for Chinese Patent Application No. 201610034386.7.

\* cited by examiner

METHOD FOR PRODUCING A VARIABLE TURBINE GEOMETRY

CROSS-REFERENCE TO RELATED APPLICATIONS

This application claims priority to German Patent Application No. 10 2015 201 078.3, filed Jan. 22, 2015, the contents of which are hereby incorporated by reference in their entirety.

TECHNICAL FIELD

The present invention relates to a method for producing a variable turbine geometry for a charging device, and to such a variable turbine geometry. The invention furthermore relates to a charging device, in particular to an exhaust gas turbocharger, having such a variable turbine geometry.

BACKGROUND

Charging devices, in particular exhaust gas turbochargers, are well known from the prior art. In this case, a turbine wheel is driven by a driving fluid, in particular by the exhaust gas, and transmits said driving power via a shaft to a compressor wheel. In order, in particular at different operating points, to increase the power of the charging device, it is furthermore known to provide the charging device with a variable turbine geometry which surrounds the turbine wheel with a plurality of guide blades. It is possible here by means of the guide blades to influence the flow of the driving fluid, that is to say in particular the exhaust gas, to the turbine wheel. For example, it is possible here, in a closed state of the guide blades, to reduce a flow cross section for the driving fluid or exhaust gas such that the driving fluid impinges on the turbine wheel at an increased velocity and drives said turbine wheel more rapidly. The guide blades are customarily mounted rotatably in a blade mounting ring. A cover disc is customarily arranged on that side of the guide blades which faces away from the blade mounting ring. A gap remains here between the guide blades and the cover disc, the size of which gap has to be kept as small as possible to improve the efficiency of the variable turbine geometry.

For this purpose, it is proposed in EP 0 226 444 B1 to insert spacers between the blade mounting ring and the cover disc, said spacers providing a fixed spacing between the cover disc and the blade mounting ring.

In addition, it is proposed in EP 1 577 503 B1 for this purpose to form the cover disc and/or the blade mounting ring in a stepped manner or to provide same with steps.

A disadvantage in the case of variable turbine geometries is in particular the fact that the guide blades are affected by manufacturing tolerances. That is to say, the gap between the respective guide blades and the cover disc varies because of the manufacturing tolerances. As a result, the gap cannot be optimally minimized, in particular because the maximum possible tolerance deviations have to be taken into consideration for the operability of the variable turbine geometry.

SUMMARY

The present invention is therefore concerned with the problem of specifying, for a method for producing a variable turbine geometry, and for such a variable turbine geometry and such a charging device, improved or at least alternative embodiments which are distinguished in particular by simplified production and/or by improved efficiency.

This problem is solved according to the invention by the subject matter of the independent claims. Advantageous embodiments are the subject matter of the dependent claims.

The present invention is based on the basic concept of, for producing a variable turbine geometry, first of all inserting at least two guide blades in a blade mounting ring of the variable turbine geometry and then jointly machining at least two of the guide blades inserted into the blade mounting ring on the end sides thereof facing away from the blade mounting ring. As a result, manufacturing tolerances of the guide blades can be minimized and/or the manufacturing tolerances of the guide blades can be compensated for. By this means, it is in particular possible, in the case of the variable turbine geometry mounted in an associated charging device, effectively to minimize a spacing from a cover disc lying opposite the end sides of the guide blades, in order to achieve an increase in power of the variable turbine geometry and/or of the charging device. According to the inventive concept, first of all at least two guide blades of the variable turbine geometry are therefore inserted into the blade mounting ring and subsequently at least two of the guide blades, in the mounted state, that is to say in the state inserted into the blade mounting ring, are jointly machined on the end sides thereof facing away from the blade mounting ring. The machining takes place here in such a manner that a final shape of the end sides of the machined guide blades is thereby produced.

The joint machining of the end sides means here in particular that the end sides are machined in the same working step. The end sides are therefore machined in particular simultaneously and/or with the same tool or the same tools in order to produce the respective final shape of the end sides.

It is furthermore particularly preferred if all of the guide blades of the variable turbine geometry are first of all inserted into the blade mounting ring and are subsequently jointly machined on the end sides thereof in order to produce the final shape.

Prior to the machining of the end sides, the variable turbine geometry is preferably produced or mounted to an extent such that only slight displacements, if any at all, of the guide blades take place after the machining of the end sides. Such displacements refer in particular to along an axis of rotation of the respective guide blades. That is to say that the variable turbine geometry is mounted, prior to the machining of the end sides, to such an extent that subsequently a spacing between the corresponding guide blades and the blade mounting ring changes only slightly, if at all, as a result of displacements of the guide blades. Therefore, only correspondingly slight changes in the spacings of the guide blades from the cover disc occur in the state of the variable turbine geometry mounted into the associated charging device.

Furthermore, variants are advantageous, in which the machining of the end sides takes place in such a manner that the end sides of the machined guide blades, that is to say the end sides of the guide blades having the final shape, lie in a common plane. In particular, the spacing between the end sides of the guide blades and the cover disc of the charging device can therefore be set more precisely and in particular dimensioned smaller. That is to say that, by this means, a realization of the variable turbine geometry and of the charging device is possible, in which the machined end sides each have an identical spacing from the cover disc.

The machining of the respective end side can take place in any manner if it is associated with a change in the end side to form the final shape. It is conceivable in particular to abrade a certain portion of the end surface. For this purpose, use may be made of any tools. In order to machine the end sides, use is made, for example, of beams, in particular electromagnetic beams, in particular by means of a laser device, and/or electron beams.

Alternatively or additionally, the respective end side can be machined by removal of material. That is to say that the respective end side is in particular ground and/or planed and/or milled and the like.

It has proved advantageous if the guide blades to be machined are secured prior to the machining. This ensures that the guide blades are arranged immovably, in particular immovably with respect to the blade mounting ring, during the machining. A more precise machining of the guide blades is therefore possible, as a result of which in particular manufacturing tolerances can be reduced further.

It is conceivable that at least one of the guide blades to be machined is unmachined on the end side thereof prior to the joint machining in order to produce the final shape. That is to say that this end side remains in the "rough state" prior to the machining to produce the final shape. By this means, the production of the guide blades can be realised more simply and cost-effectively.

According to an advantageous embodiment, the variable turbine geometry is cleaned after the machining of the end sides in order in particular to remove material residues occurring because of the machining. By this means, in particular, a friction-free operation of the variable turbine geometry is ensured or at least the risk of corresponding operating malfunctions is at least reduced.

In an advantageous development, the variable turbine geometry is designed as a premanufactured assembly. The assembly here has in particular the blade mounting ring and the guide blades mounted therein. By this means, a simplified installation of the variable turbine geometry into the associated charging device is possible. In particular, a spacing or gap between the end sides of the guide blades and the cover disc can thereby be reduced, which is associated with an increase in the efficiency of the variable turbine geometry and therefore of the charging device.

It goes without saying that, in addition to the method for producing such a variable turbine geometry, a charging device having such a variable turbine geometry also belongs to the subject matter of this invention. Of course, a variable compressor geometry can also be produced in the same manner.

The charging device here can be configured as desired. It is conceivable in particular for the charging device to be designed as an exhaust gas turbocharger which is impinged on the turbine side with exhaust gas which passes through the variable turbine geometry to a turbine wheel. Such an exhaust gas turbocharger can be used in an internal combustion engine of a vehicle.

Further important features and advantages of the invention emerge from the dependent claims, from the drawings and from the associated description of the figures with reference to the drawings.

It goes without saying that the features mentioned above and those which have yet to be explained below are usable not only in the respectively stated combination but also in different combinations or on their own, without departing from the scope of the present invention.

Preferred exemplary embodiments of the invention are illustrated in the drawings and are explained in more detail in the description below, wherein the same reference numbers refer to identical or similar or functionally identical components.

BRIEF DESCRIPTION OF THE DRAWINGS

In the drawings, in each case schematically.

DETAILED DESCRIPTION

Figure 1:
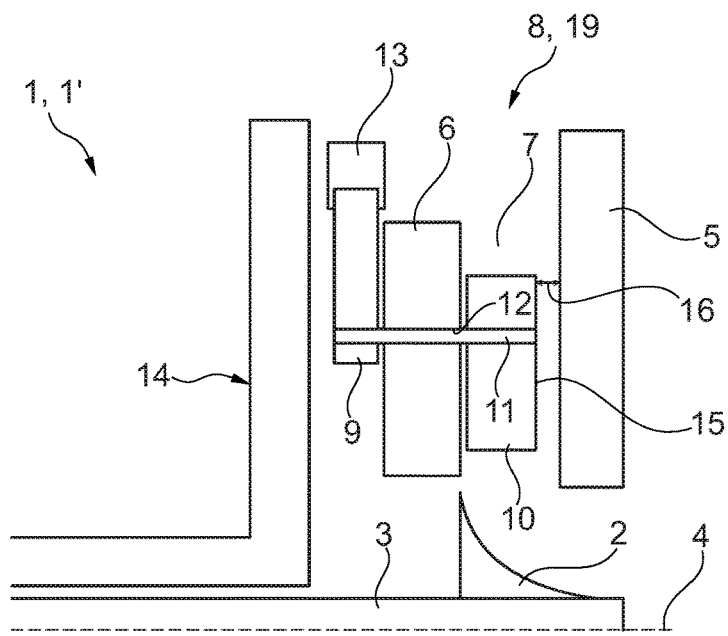
FIG. 1 shows a section through a charging device.

FIG. 1 shows a section through a charging device 1, in particular through an exhaust gas turbocharger 1', wherein the charging device 1 can only partially be seen. The charging device 1 has a turbine wheel 2 which is connected to a shaft 3 for rotation therewith. The turbine wheel 2 and the shaft 3 are rotatable about an axis of rotation 4, wherein only the upper part of the charging device 1 can be seen with respect to the axis of rotation 4. Rotation of the turbine wheel 2 can be transmitted by means of the shaft 3 to a compressor wheel (not shown) of the charging device 1. The turbine wheel 2 is driven here by a fluid, in particular by the exhaust gas which originates from an internal combustion engine and flows to the turbine wheel 2 through a duct 7 formed between a cover disc 5 and a blade mounting ring 6. The blade mounting ring 6 is part of a variable turbine geometry 8 which, in addition, has an adjusting ring 13 arranged on that side of the blade mounting ring 6 which faces away from the duct 7, and at least one guide blade 10 which is arranged on that side of the blade mounting ring 6 which faces away from the adjusting ring 13. Only one such guide blade 10 can be seen here in FIG. 1. The guide blade 10 has a blade journal 11 which is guided through a mounting 12 of the blade mounting ring 6 and is coupled to the adjusting ring 13 via a control lever 9. The adjusting ring 13 is adjusted via a control device, as a result of which the guide blade 10 mounted in the blade mounting ring 6 via the blade journal 11 is correspondingly adjusted. By this means, a cross section of the duct 7 can be changed and therefore the flow of the fluid driving the turbine wheel 2 can be set. The variable turbine geometry 8 can be arranged here in a turbine housing (not shown here) in which the cover disc 5 is also arranged or which has the cover disc 5 as a component. The shaft 3 is mounted in a bearing housing 14.

It can be seen in FIG. 1 that an end side 15 of the guide blade 10, which end side faces the cover disc 5 and faces away from the blade mounting ring 6, is arranged spaced apart from the cover disc 5. A gap 16 is formed between the guide blade 10 or the end side 15 thereof and the cover disc 5. The reduction of said gap 10 leads to an increase in efficiency of the variable turbine geometry 8 or of the charging device 1.

Figure 2:
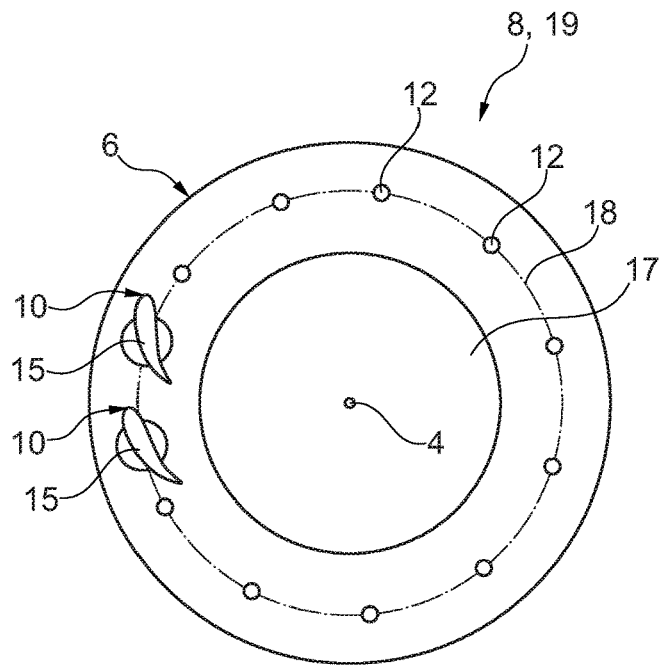
FIG. 2 shows a top view of a variable turbine geometry.

FIG. 2 shows a top view of the variable turbine geometry 8. It can be seen here that the blade mounting ring 6 is of annular design and has a central opening 17 through which the shaft 3 is guided in the state mounted in the charging device 1. It can also be seen that the blade mounting ring 6 has a plurality of such receptacles 12 which are arranged uniformly along a circle 18. Such a guide blade 10 is mounted rotatably in the respective receptacle 12, wherein FIG. 2 merely illustrates two such guide blades 10, the end sides 15 of which can be seen. In order to reduce, in particular to minimize, the gap 16 between the end sides 15 of the guide blades 10 and the cover disc 5, the variable turbine geometry 8 is produced as described below:

First of all, the guide blades 10 are inserted into the blade mounting ring 6 by the respective blade journals 11 being introduced into such an associated receptacle 12. In addition, the respective blade journal 11 can be connected to the adjusting ring 13 via the control lever 9. The end sides 15 of the guide blades 10 are subsequently jointly machined in order to produce a final shape of the end sides 15 of the guide blades 10. The machining takes place here in such a manner that the end sides 15 of the guide blades 10 substantially lie in one plane. As a result, the gap 16 can turn out to be smaller and can be minimized. In particular, a corresponding spacing between the cover disc 5 and the end sides 15, and therefore the gap 16, can be reduced when the variable turbine geometry 8 is installed in the charging device 1. By this means, a negative influencing of the reduction of the gap 16, which negative influencing is caused by manufacturing tolerances of the guide blades 10, is avoided or at least reduced. The end sides 15 of the guide blades 10 can be unmachined here prior to the joint machining to produce the final shape, that is to say the final shape of the end sides 15.

The machining of the end sides 15 in order to produce the final shape takes place here as desired. In particular, the end sides 15 of the guide blades 10 can be jointly machined by removal of material in order to produce the final shape of the end sides 15. It is advantageous in this case if the guide blades 10 are secured prior to the machining to produce the final shape of the end sides 15. Said securing can be carried out, for example, by means of the adjusting ring 13. However, other types of securing, in which, in particular, the respective blade journal 11 is secured in order to prevent or at least to reduce a corresponding movement of the associated guide blades 10, in particular with respect to the blade mounting ring 6, are also conceivable.

The variable turbine geometry 8 is cleaned after the machining of the end sides 15 to form the final shape, in order in particular to remove material residues occurring because of the machining. The variable turbine geometry 8 is preferably designed as a premanufactured assembly 19 which has at least the blade mounting ring 6 and the guide blades 10 with the end sides 15 having the final shape. Alternatively, the adjusting ring 13 can also be a component of the assembly 19. By this means, the mounting of the variable turbine geometry 8 into the charging device 1 is simplified.

The invention claimed is:

1. A method for producing a variable turbine geometry of a charging device, comprising:
   inserting at least two guide blades into a blade mounting ring; and
   jointly machining at least two of the guide blades, in the mounted state, on respective end sides of the at least two of the guide blades facing away from the blade mounting ring in order to produce a final shape of the end sides.

2. A method according to claim 1, wherein the guide blades are machined on the end sides thereof by removal of material.

3. A method according to claim 2, wherein the machining takes place in such a manner that the end sides of the machined guide blades lie in a common plane.

4. A method according to claim 2, wherein at least one of the guide blades to be machined remains in an unmachined state on the end side thereof prior to the machining.

5. A method according to claim 1, wherein all of the guide blades of the variable turbine geometry are inserted into the blade mounting ring and are subsequently jointly machined on the end sides thereof.

6. A method according to claim 1, wherein the machining takes place in such a manner that the end sides of the machined guide blades lie in a common plane.

7. A method according to claim 1, further comprising securing the guide blades to be machined prior to the machining.

8. A method according to claim 7, wherein the securing is carried out by an adjusting ring of the variable turbine geometry.

9. A method according to claim 8, wherein the securing includes connecting blade journals of the guide blades to be machined to the adjusting ring via a control lever.

10. A method according to claim 7, further comprising cleaning the variable turbine geometry after the machining.

11. A method according to claim 1, wherein at least one of the guide blades to be machined remains in an unmachined state on the end side thereof prior to the machining.

12. A method according to claim 1, further comprising cleaning the variable turbine geometry after the machining.

* * * * *